Dec. 2, 1947.  A. J. RHODENBAUGH  2,431,963
COMBINATION ROTARY SOIL SHIELD AND CULTIVATOR
Filed Feb. 15, 1946
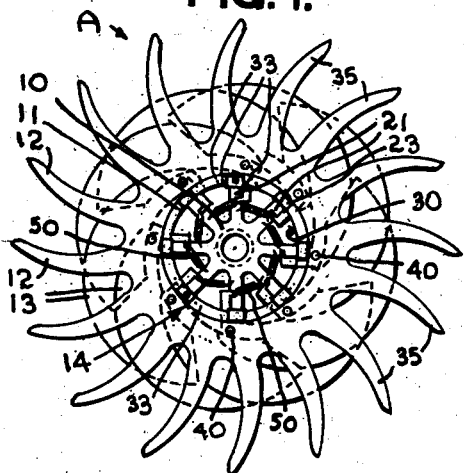
FIG. 1.
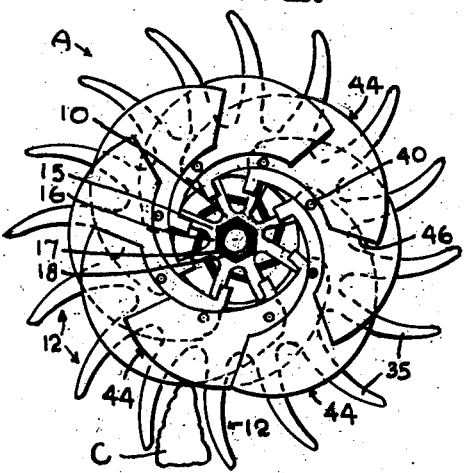
FIG. 2.
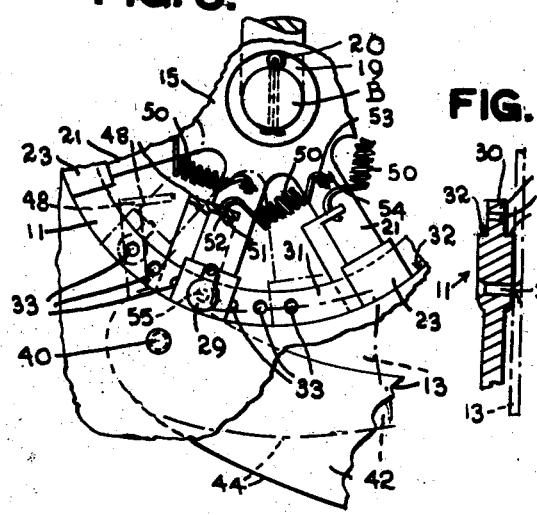
FIG. 3.
FIG. 5.
FIG. 4.
FIG. 6.
INVENTOR.
Alvin J. Rhodenbaugh
BY
ATTORNEYS.

Patented Dec. 2, 1947

2,431,963

UNITED STATES PATENT OFFICE 2,431,963

COMBINATION ROTARY SOIL SHIELD AND CULTIVATOR

Alvin J. Rhodenbaugh, Harmon, Ill.

Application February 15, 1946, Serial No. 647,759

7 Claims. (Cl. 97—188)

This invention relates to agricultural machinery and more particularly to a combination soil shield and row cultivator-mulcher, for association with various cultivating devices, as cultivator shovels or sweeps. Soil shields are employed to control the movement of soil dislodged by cultivator sweeps and the like, during soil-cultivating operation.

An important object of the invention is to provide a novel rotary shield and row cultivator-mulcher which will not be apt to become fouled with clods, roots, stalks, stubble, vines and the like, a disadvantage of soil shields in general, and not wholly obviated in rotary shields.

Another important object is to provide an adjustable rotary shield, whereby the extent of movement of the soil, dislodged by the sweeps or the like, may be controlled.

Still another important object is to provide an adjustable rotary soil shield, as described, which will yield radially when an obstruction, as a stone, is encountered.

A major object is to provide a combination rotary shield, as described, mounted upon and for association with, a tined cultivator-mulcher wheel which is adapted to operate in the row, where the conventional sweeps, for instance, cannot be employed.

Another major object is to provide a sturdy adjustable shield and row cultivator-mulcher so constructed that upon rotation, it tends to dislodge and force obstruction from between the sweeps.

Other objects and advantages of the invention will be apparent during the course of the following detailed description of the invention, taken in connection with the accompanying drawing, forming a part of this specification, and in which drawing:

Figure 1 is an elevation of one face of the novel combination rotary shield and cultivator-mulcher.

Figure 2 is an elevation of the other face thereof, illustrating the shield yielding to an obstruction.

Figure 3 is an enlarged fragmentary elevation of a portion of the novel device, illustrating the adjusting means thereof in full lines and an adjusted position of parts in dots and dashes.

Figure 4 is an enlarged vertical fragmentary section through the novel device adjacent the axial center thereof.

Figure 5 is also an enlarged vertical fragmentary section through a pivot carrying portion of the new shield.

Figure 6 is a perspective view of one of the shield sections of the new device.

In the drawing, wherein for the purpose of illustration is shown a preferred embodiment of the invention and wherein similar reference characters designate corresponding parts throughout the several views, the letter A designates the novel combination rotary shield and cultivator-mulcher, the letter B a support portion of a vehicle, and the letter C an obstruction encountered by the device A, equipped with A.

The new device includes a hub portion 10, a rim portion 11, soil-engaging members 12, carried by and extending radially from the rim portion 11, soil shield sections 13 pivotally carried by the rim portion 11, and means 14 to adjust the relationship of the shield sections 13 with the members 12, which means also provides for yielding of the shield sections 13 when encountered by an obstruction, as C.

Referring more particularly to Figures 1, 2, and 4, the hub portion 10 comprises a centrally or axially-disposed plate or disc 15, from the axial center of one face 16 thereof may project a suitable means to assist in securing the device A to a support, such means being shown as a nut 17 which is, preferably, integral with the disk 15, and extending from the nut 17 is a tubular member 18 adapted to slidably receive a part of the support portion 8 as in Figure 4. The new device A may be retained on this support, as by the washers 19 and cotter pins 20.

Extending radially from the outer edge of the disc 15 are a plurality of substantially equally spaced-apart spokes or arms 21, each terminating, at its free end section 22, in a substantially U-shaped shoulder 23. The shoulders 23 are adapted to receive, in good frictional contact therewith, spaced-apart inner edge sections of the rim portion 11.

Each shoulder 23 comprises the extreme outer free end section 22 of a spoke 21 and an L-shaped section with the smaller limb 24 of the L-shaped section extending from the face 25 of the spoke 21, inwardly of the outer extremity of the spoke, and the larger limb 26 of the L-shaped section paralleling the free end section 22, or, in other words, paralleling the face 25. Preferably the innermost face 27 of the shoulder 23 is arcuate to conform to the arc of the inner edge or periphery 30 of the rim portion 11. Extending through preferably each of two spokes 21, disposed substantially 180° apart, are a pair of axially aligned perforations 28 disposed at the shoulder 23 and shown more particularly in Figure 4. That is, one of the axially aligned perforations 28 extends through the larger limb 27 and the other extends through the free end section 22. If desired a conventional spring metal clip 29 may be employed including an arm portion secured at adjacent the inner end of the outer face of the limb 27 and a cup portion disposed over the perforation 28. The functions of the perforations 28 and clips 29 will be subsequently described.

The rim portion 11 is provided with an inner edge or periphery 30 adapted for frictional contact with the face 27 of the shoulder 23, with the inner faces of the shoulder sections 22 and 26 of the shoulder contact the inner rim section 31 of the rim portion 11.

So that a good adjustable connection of hub portion and rim portion may be effected, the rim portion may be enlarged in thickness inwardly of its periphery 30 so that a pair of shoulders or abutments 32 are provided for the free ends of the shoulders 23.

Spaced along this rim section 31 are two rows of perforations 33, the center perforation 33 of one row being substantially 180° from the center perforation 33 of the other row. These perforations 33 align, upon rotating the rim portion 11 relative to the hub portion 10.

Inwardly of the periphery 30 and inwardly of the abutments 32 are a plurality of substantially equally spaced-apart pivot-accommodating perforations 34. These accommodate the pivots 40 for the soil shield sections 13.

Extending radially from the rim portion 11, which is, preferably, quite narrow, are a plurality of suitable tines or arms 35, adapted to break up the soil. There are, preferably, somewhat arcuate longitudinally and have suitable edges, free ends and faces to engage the soil.

Pivotally carried by the rim portion 11 are a plurality of overlapping soil shield sections 13, each having a suitable pivot pin 40 extending through the perforations 34, and perforation 41 in the soil shield section 13.

These soil shield sections 13 are substantially all alike and one is shown particularly in Figure 6. Each includes a blade portion 42 and a stop portion 43. The portion 42 is, preferably quite flat so that the faces of one portion 42 will be in contact with the faces of the overlapping blade portions 42. The blade portions 42 may be said to be somewhat scimitar-shaped, with opposite arcuate edges 44 and 45 and a substantially straight end edge 45. Because of the arcuate outer edge 44 of each portion 42, the outer edge defined by all the overlapping shield sections 13 is normally somewhat circular, as may be seen in Figure 1. Thus, while the soil shield is made up of a plurality of sections 13 its outer periphery is spaced almost the same distance from the axis of rotation of the novel device A, all around the soil shield. Thus the soil shielding effect is substantially the same along the row being cultivated.

To retain the soil shield sections 13 in this position, yet admit to movement of any shield section independently of the others and, too, adjustable simultaneous movement of all the shield sections, by one and the same means, I employ, preferably, the means 14.

The means 14 makes use of certain portions of the structures described as well as others to be described. The means 14 includes the stop portions 43 of the shield sections 13, which portions 43 are, preferably, integral with the blade portions 42, and a relatively narrow elongation 47 at the end of each blade portion opposite the edge 46. At the free end of the elongation 47, the material is turned up to provide a guide 48, so that the elongation and guide form substantially a right angle. At the base of the guide 48, where it joins the elongation 47 is a slot 49 for receiving a portion of a spoke 21 so that a portion of a guide 47 overlies a portion of a spoke 21, and a portion of the elongation 46 is in face-to-face contact with a portion of the face 25 of the spoke 21.

A suitable resilient means, as a retraction coil spring 50 is provided and may have one end 51 extending through a perforation 52 in the guide 48, the body of the spring so extending across the face 25 of one spoke 21, and its other end 53 threaded through an eye 54 projecting from the face 25 of the next spoke 21, as in Figure 3. Thus the springs 50 normally retain portions of the spokes 21 within the slots 49, but the pivoted soil shield sections 13 may oscillate so that, at times, the slots will be partly open. Such is the case, as in Figure 2 where an obstruction C causes one of the shield sections 13 to pivot and thus the soil shield may be said to give when encountering such obstructions. Rigid rotating soil shields are subject to frequent damage because of their rigidity under the same circumstances.

But the means 14 provides for changes in the size of the soil shielding area of the device A and embraces suitable removable pins 55, with their shanks extending through the perforations 28 in the shoulders 23 and through any of the perforations 33 in the rim portion 11. The heads of the pins 55 are selectively covered by the free ends of the clips 29. Of course there are two such pins, in the example shown.

From the above and from the full lines and dot-and-dash showings of Figure 3 it is now obvious that by removing the two pins 55 and rotating the rim portion 11 clockwise, the blade portions 42 will swing on their respective pivots 40 and their free ends will move toward the axis of rotation of the device A thus decreasing the soil shielding area of the device, but if the rim portion is rotated anti-clockwise, the blade portions 42 will rotate on their pivots so that their free ends will move away from this axis of rotation, and the effective soil shielding area will be increased.

Thus, the means 14 not only provides for this adjustable increase or decrease in soil shielding area, simply by removing two pins 55, rotating the rim portion 11 and replacing the pins 55, but it also permits any one (or several adjacent) soil shield sections 13 to oscillate independently of all the others when encountering an obstruction.

While the soil shield sections 13 may be of relatively thin metal, because of the fact that they overlap one another and have the rim portion 11 and tines 35 as side supports, they are, as a unit, sturdy and effective.

The novel combined rotary soil shield and row cultivator-mulcher A may be secured to a suitable portion, as A, conventional J-shaped support portion B of a cultivator, preferably quite closely adjacent the front sweeps or shovels 60, as in Figure 6, one device A between each front sweep and the row to be cultivated. As the sweeps turn up the soil only a portion thereof will move through the spaces below the shield sections 13 and the other portions will be deflected by the same sections 13. At the same time the tines 35 will break up the soil and create a mulch.

Various changes may be made to the form of the invention herein shown and described without departing from the spirit of the invention or scope of the claims.

I claim:

1. In a soil shield for association with a cultivator having a support, said soil shield including a hub portion rotatably carried by said support, a rim portion adjustably carried by said hub portion, arms extending from said hub portion to said rim portion, a plurality of soil-engaging members extending radially outward from and carried by said rim portion, a plurality of soil shield sections, movably carried by said rim portion and disposed in overlapping relationship, one with another, the outermost edges of said shield sections being inwardly of the outermost ends of said soil-engaging members, and means, carried partly by said rim portion and partly by said arms, to adjust the distance between the outermost edges of said shield sections and the outermost ends of said soil engaging members.

2. In a soil shield for association with a cultivator having a support, said soil shield including a hub portion rotatably carried by said support, a rim portion adjustably carried by said hub portion, arms extending from said hub portion to said rim portion, a plurality of soil-engaging members extending radially outward from and carried by said rim portion, a plurality of soil shield sections, pivotally carried by said rim portion and disposed in overlapping relationship, one with another, the outermost edges of said shield sections being inwardly of the outermost ends of said soil-engaging members, and means, carried partly by said rim portion and partly by said arms, to adjust the distance between the outermost edges of said shield sections and the outermost ends of said soil engaging members.

3. In a soil shield for association with a cultivator having a support, said soil shield including a hub portion rotatably carried by said support, a rim portion adjustably carried by said hub portion, arms extending from said hub portion to said rim portion, a plurality of soil-engaging members extending radially outward from and carried by said rim portion, a plurality of soil shield sections, movably carried by said rim portion and disposed in overlapping relationship, one with another, the outermost edges of said shield sections being arcuate and disposed inwardly of the outermost ends of said soil-engaging members, and means, carried partly by said rim portion and partly by said arms, to adjust the distance between the outermost edges of said shield sections and the outermost ends of said soil engaging members.

4. In a combination rotary soil shield and cultivator-mulcher for association with a vehicle having a support, said combination rotary soil shield and cultivator-mulcher including a central portion rotatably carried by said support, a rim portion rotatably carried by said central portion, coupling means to couple said portions together against rotation of said rim portion, tines extending radially outwardly from said rim portion, a plurality of soil shield sections, means pivotally connecting said shield sections to said rim portion, comprising a pivot for each shield section, extending into said rim portion, said shield sections being disposed in overlapping relationship, one with another, and each having a face area closely adjacent said tines, and means cooperating with said coupling means to adjust the distance between the outermost edges of said shield sections and the outermost ends of said tines.

5. In a combination rotary soil shield and cultivator-mulcher for association with a vehicle having a support, said combination rotary soil shield and cultivator-mulcher including a central portion rotatably carried by said support, arms extending radially from said central portion, each provided with a shoulder section at its free end, provided with a perforation, a rim portion, having an inner periphery and a plurality of spaced apart perforations adjacent said periphery, said rim portion being rotatably carried by said central portion, with parts of the inner periphery against said shoulder sections and parts of the rim portion, adjacent said periphery, in frictional contact with said shoulder sections, coupling means carried by said shoulder sections and rim portion to selectively couple said portions together against rotation of said rim portion, comprising a coupling pin disposed in said first-named perforation and extending into any of said plurality of perforations, tines extending radially outwardly from said rim portion, a plurality of soil shield sections, pivotal means, pivotally connecting each soil shield section to said rim portion with said soil shield sections in overlapping relationship and with their outermost edges spaced inwardly of the outer ends of said tines, all of said soil shield sections being disposed close to said tines, each of said soil shield sections having an open-ended slot, accommodating parts of said arms, there being a separate slot for each arm, and means to resiliently retain said parts of said arms within said slots, comprising a retraction coil spring for each soil shield section, secured at one of its ends to one of said soil shield sections and secured at the other of its ends to one of said arms.

6. In a combination rotary soil shield and cultivator-mulcher for association with a vehicle having a support, said combination rotary soil shield and cultivator-mulcher including a central portion rotatably carried by said support, arms extending radially from said central portion, each provided with a shoulder section at its free end, provided with a perforation, a rim portion having an inner periphery and a plurality of spaced apart perforations adjacent said periphery, said rim portion being rotatably carried by said central portion, with parts of the inner periphery against said shoulder sections and parts of the rim portion, adjacent said periphery, in frictional contact with said shoulder sections, coupling means carried by said shoulder sections and rim portion to selectively couple said portions together against rotation of said rim portion, comprising a coupling pin disposed in said first-named perforation and extending into any of said plurality of perforations, tines extending radially outwardly from said rim portion, a plurality of soil shield sections, pivotal means, pivotally connecting each soil shield section to said rim portion at adjacent one end of each soil shield section, with said soil shield sections in overlapping relationship and with their outermost edges spaced inwardly of the outer ends of said tines, all of said soil shield sections being disposed close to said tines, each of said soil shield sections having an open-ended slot, accommodating parts of said arms, there being a separate slot for each arm, and means to resiliently retain said parts of said arms within said slots, comprising a retraction coil spring for each soil shield section, secured at one of its ends to one of said soil shield sections and secured at the other of its ends to one of said arms.

7. In a combination rotary soil shield and cultivating-mulching device for association with a vehicle having a support, said device including means to rotatably secure said device to said support, including a hub portion, a rim portion, operatively connected with the hub portion, a plurality of tines carried by said rim portion, soil shield means pivotally carried by said rim portion including a plurality of overlapping soil shield sections each having a face area closely adjacent said tines, and adjusting and retaining means to move said soil shield means toward and away from the free ends of said tines, and to retain said soil shield means in its moved position, said means being carried partly by said rim portion and said soil shields.

ALVIN J. RHODENBAUGH.

REFERENCES CITED

The following references are of record in the file of this patent:

UNITED STATES PATENTS

| Number | Name | Date |
|---|---|---|
| 1,880,584 | Tibbitts | Oct. 4, 1932 |

Certificate of Correction

Patent No. 2,431,963. December 2, 1947.

ALVIN J. RHODENBAUGH

It is hereby certified that error appears in the printed specification of the above numbered patent requiring correction as follows: Column 2, line 30, for the numeral "8" read $B$; and that the said Letters Patent should be read with this correction therein that the same may conform to the record of the case in the Patent Office.

Signed and sealed this 2nd day of March, A. D. 1948.

[SEAL]

THOMAS F. MURPHY,
*Assistant Commissioner of Patents.*